Sept. 13, 1955

G. E. TURNER 2,717,816

AUTOMOBILE SERVICE TRAY AND SLIDE
MEANS FOR MOUNTING THE SAME

Filed June 7, 1954

Grady Eugene Turner
INVENTOR.

BY *Clarence A. O'Brien*
*and Harvey B. Jacobson*
Attorneys

Sept. 13, 1955

G. E. TURNER 2,717,816

AUTOMOBILE SERVICE TRAY AND SLIDE
MEANS FOR MOUNTING THE SAME

Filed June 7, 1954

*Grady Eugene Turner*
INVENTOR.

United States Patent Office 2,717,816
Patented Sept. 13, 1955

2,717,816
AUTOMOBILE SERVICE TRAY AND SLIDE MEANS FOR MOUNTING THE SAME
Grady Eugene Turner, Atlanta, Ga.
Application June 7, 1954, Serial No. 434,886
1 Claim. (Cl. 311—21)

This invention relates to an attachment for an automotive vehicle and more particularly to a serving tray adapted to be attached to the instrument panel of a vehicle.

The primary object of the present invention resides in the provision of a serving tray adapted to be associated with the instrument panel of an automotive vehicle.

A further object of this invention resides in the provision of novel means for securing the serving tray beneath the instrument panel of a vehicle so as to enable the maximum portion of the serving tray to be utilized.

A further object of this invention resides in the provision of novel means for supporting the tray plate of a serving tray so as to permit substantially all of the serving tray to be outwardly extended from the support, yet which will enable the serving tray to be substantially entirely retracted into the supporting structure.

Still further objects and features of this invention reside in the provision of a serving tray for attachment beneath the instrument panel of a vehicle which is strong and durable, simple in construction and installation, adapted to provide an optimum supporting surface while also being completely retractable, and which is inexpensive to produce, thereby permitting wide distribution.

These, together with the various ancillary objects and features of the invention which will become apparent as the following description proceeds, are attained by this serving tray, a preferred embodiment of which has been illustrated in the accompanying drawings, by way of example only, wherein.

Figure 1:
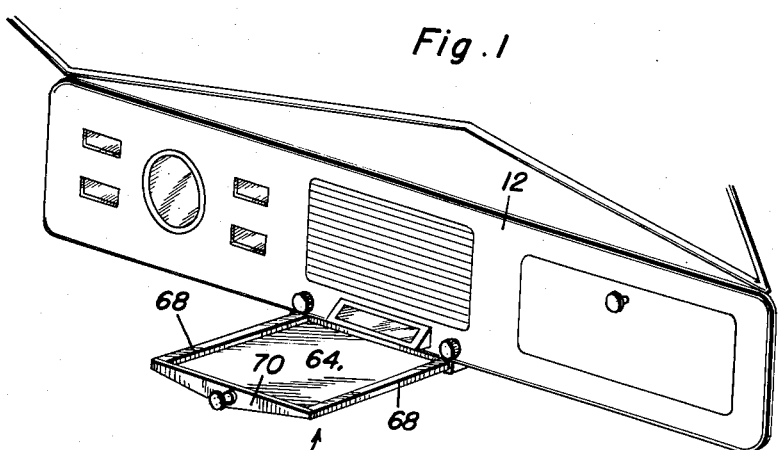
Figure 1 is a perspective view illustrating the manner in which the serving tray is suspended beneath the instrument panel of a vehicle.
Figure 3:
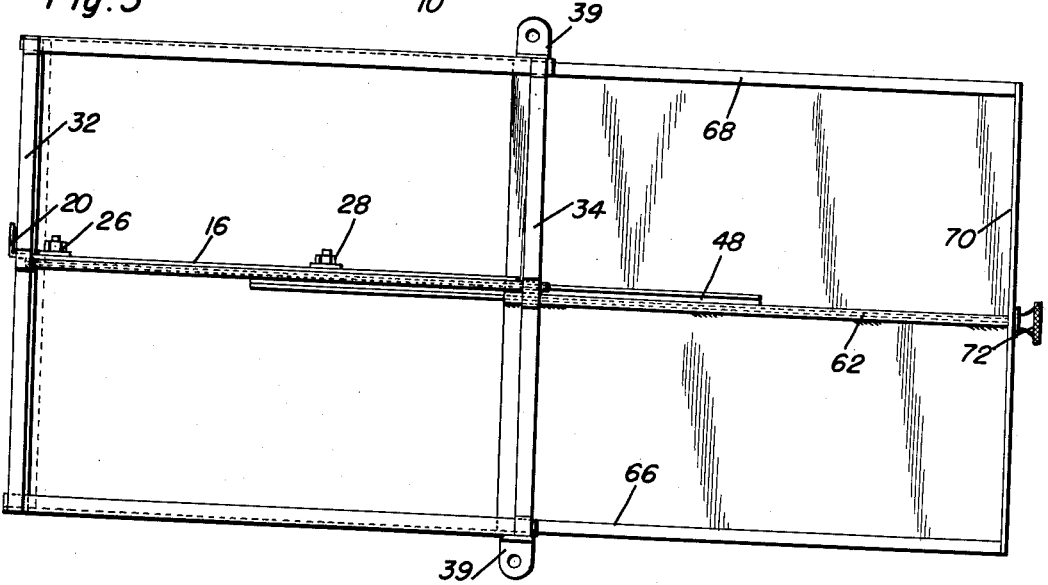
Figure 3 is a bottom plan view of the serving tray.
Figure 2:
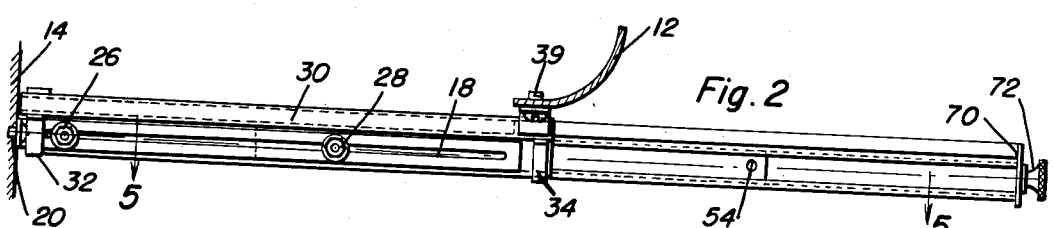
Figure 2 is a side elevational view of the serving tray.
Figure 7:
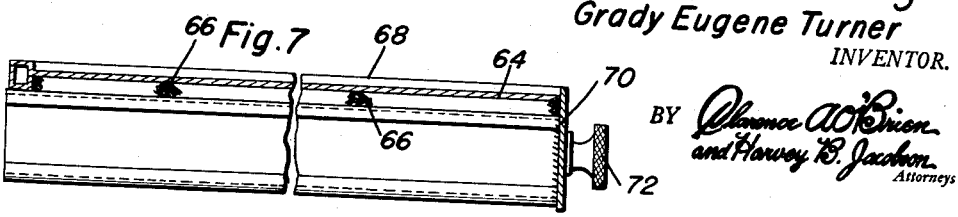
Figure 7 is a sectional detailed view illustrating the manner in which the tray plate is secured to the tray support member.
Figure 4:
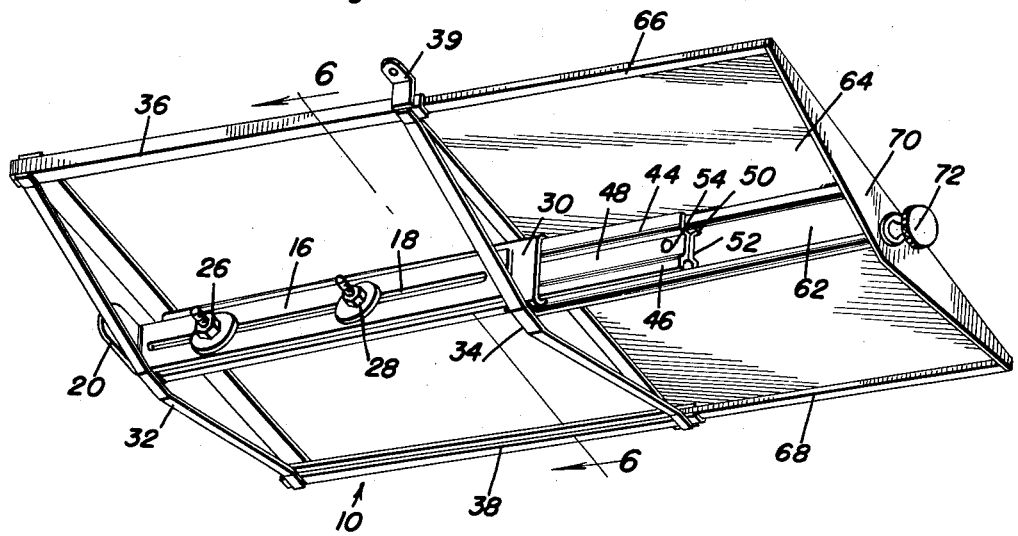
Figure 4 is a perspective view of the serving tray illustrating the construction of the support members thereof.
Figure 5:
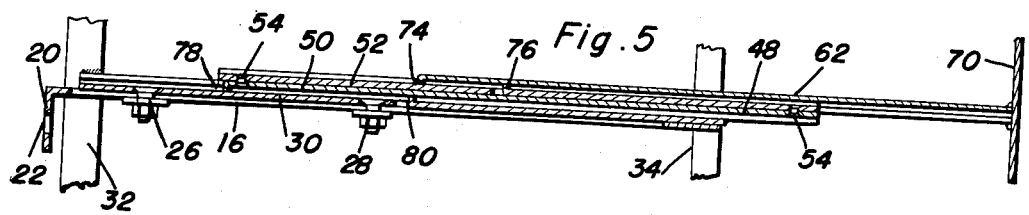
Figure 5 is a vertical sectional view as taken along the plane of line 5—5 in Figure 2.
Figure 6:
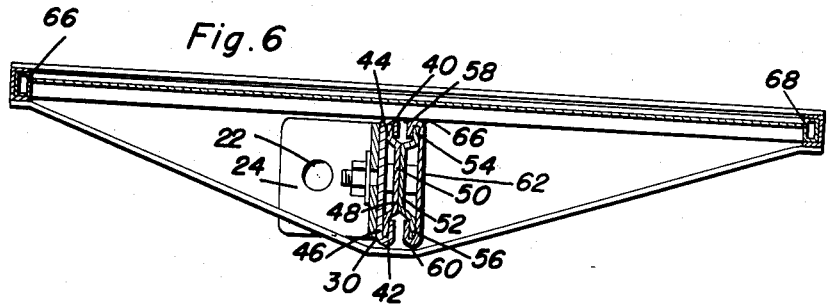
Figure 6 is an enlarged vertical sectional view as taken along the plane of line 6—6 in Figure 4.

With continuing reference to the accompanying drawings wherein like reference numerals designate similar parts throughout the various views, reference numeral 10 generally designates the serving tray comprising the present invention. This serving tray is adapted to be secured beneath the instrument panel 12 of a vehicle and may be secured to the fire-wall or other supporting structure 14 of the vehicle.

The serving tray 10 includes an attaching plate 16 having an elongated slot 18 therein and having a tab 20 provided with an aperture 22 through which a screw fastener, or the like, can extend for securing the serving tray to the fire-wall 14, or other supporting structure.

Adjustably secured to the attaching plate 16 by means of bolts 26 and 28 is a substantially C-shaped central support 30 to which a frame including frame members 32 and 34 is attached. The frame members 32 and 34 extend transversely with respect to the tray and carry channel shaped guides 36 and 38 spaced outwardly from the central support 30. Attached to the channel shaped guides 36 and 38 are brackets 39 for mounting the tray 10 beneath the instrument panel 12.

The flange portions 40 and 42 of the central support 30 engage upper and lower flanges 44 and 46 of a floating member 48 formed of two U-shaped elements 50 and 52 which may be riveted or otherwise secured together as at 54. The other set of flanges 54 and 56 of the floating member 48 is engaged by the flanges 58 and 60 of a C-shaped tray supporting member 62 to which the tray plate 64 is welded as at 66, or otherwise secured.

The tray plate 64 terminates in substantially rod-like ends 66 and 68 which are formed by folding the ends of the tray to form the hollow rods 66 and 68. These rods 66 and 68 are receivable within the channel shaped guides 36 and 38. A face plate 70 is attached to the tray plate 64 and a handle 72 of any suitable construction is attached to the face plate 70 for pulling the tray outwardly. It is to be noted that the face plate 70 as well as the tubular rods 66 and 68 form guards for the edges of the tray 64 so as to prevent accidental dislocation of small objects off the tray 64 when the vehicle to which this serving tray 10 is attached is in motion.

The tray support member 62 has a stop 74 pressed inwardly therefrom which is shaped to engage a lug 76 on the floating member 48. Hence, when the tray 64 is pulled outwardly, the stop 74 will engage the lug 76 to move the floating support member 48 outwardly. The floating support 48 has the U-shaped member 50 thereof provided with a stop 78 which is adapted to engage a lug 80 pressed from the central support 30 when the floating member 48 has reached its outer limit of travel.

Thus, it can be seen that utilizing the concept of this invention, the serving tray 10 is provided with means whereby the entire tray plate 64 can be moved outwardly of the guides 36 and 38 and yet be supported by the floating member 48. This enables the maximum utilization of the supporting surface of the tray plate 64 while still enabling the tray plate 64 to be entirely retracted.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A tray for attachment below the instrument panel of a vehicle comprising a frame including a pair of spaced guides and a central support, an attaching plate, said central support being adjustably secured to said attaching plate, a floating member slidably engaging said central support, an outer tray support member slidably engaging said floating member, and a tray plate carried by said tray support member, said central support and said outer tray support being of substantially C-shaped and engaging opposed sets of upper and lower flanges of said floating member, and spaced rods secured to said tray at the side edges thereof, said rods being received in said guides, a stop on said outer tray support engageable with a lug on said floating member, and a stop on said floating member engageable with a lug on said central support.

References Cited in the file of this patent
UNITED STATES PATENTS

| | | |
|---|---|---|
| 2,270,557 | Randall | Jan. 20, 1942 |
| 2,292,797 | Roberts | Aug. 11, 1942 |
| 2,443,381 | Farrar, Jr. | June 15, 1948 |
| 2,546,459 | Lee | Mar. 27, 1951 |
| 2,634,181 | Hunt | Apr. 7, 1953 |